(12) United States Patent
Aflalo et al.

(10) Patent No.: US 12,260,323 B2
(45) Date of Patent: *Mar. 25, 2025

(54) METHODS, SYSTEMS, ARTICLES OF MANUFACTURE AND APPARATUS TO MAP WORKLOADS

(71) Applicant: Intel Corporation, Santa Clara, CA (US)

(72) Inventors: Estelle Aflalo, Haifa (IL); Amit Bleiweiss, Yad Binyamin (IL); Mattias Marder, Haifa (IL); Eliran Zimmerman, Maalot (IL)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/491,246

(22) Filed: Oct. 20, 2023

(65) Prior Publication Data
US 2024/0119271 A1 Apr. 11, 2024

Related U.S. Application Data

(63) Continuation of application No. 17/977,774, filed on Oct. 31, 2022, now Pat. No. 11,816,561, which is a
(Continued)

(51) Int. Cl.
*G06N 3/08* (2023.01)
*G06F 9/50* (2006.01)
(Continued)

(52) U.S. Cl.
CPC .......... *G06N 3/063* (2013.01); *G06F 9/5011* (2013.01); *G06F 9/5044* (2013.01); *G06F 18/217* (2023.01); *G06N 3/08* (2013.01)

(58) Field of Classification Search
CPC .......... G06N 3/063; G06N 3/08; G06N 3/006; G06N 3/045; G06N 3/048; G06N 3/0464;
(Continued)

(56) References Cited

U.S. PATENT DOCUMENTS

| 11,301,718 B2 | 4/2022 | Hamedi et al. |
| 11,526,736 B2 | 12/2022 | Aflalo et al. |

(Continued)

OTHER PUBLICATIONS

Silver, "Lecture 1: Introduction to Reinforcement Learning," David Silver, 2015, 46 pages.
(Continued)

*Primary Examiner* — Charlotte M Baker
(74) *Attorney, Agent, or Firm* — HANLEY, FLIGHT & ZIMMERMAN, LLC

(57) ABSTRACT

Methods, apparatus, systems and articles of manufacture are disclosed to map workloads. An example apparatus includes a constraint definer to define performance characteristic targets of the neural network, an action determiner to apply a first resource configuration to candidate resources corresponding to the neural network, a reward determiner to calculate a results metric based on (a) resource performance metrics and (b) the performance characteristic targets, and a layer map generator to generate a resource mapping file, the mapping file including respective resource assignments for respective corresponding layers of the neural network, the resource assignments selected based on the results metric.

20 Claims, 11 Drawing Sheets

| Start | OP Name | IFM | Layer Index | OFM | Next Layer |
|---|---|---|---|---|---|
| Layer_1 | Conv_Relu | 0:(1,3,224,224):INT8 | 0 | 4:(1,64,224,224):INT8 | 2 |
| Layer_2 | Conv_Relu_MaxPool | 4:(1,64,224,224):INT8 | 1 | 9:(1,64,112,112):INT8 | 3 |
| Layer_3 | Conv_Relu | 9:(1,64,112,112):INT8 | 2 | 13:(1,128,112,112):INT8 | 4 |
| Layer_4 | Conv_Relu_MaxPool | 13:(1,128,112,112):INT8 | 3 | 18:(1,128,56,56):INT8 | 5 |
| Layer_5 | Conv_Relu | 18:(1,128,56,56):INT8 | 4 | 22:(1,256,56,56):INT8 | 6 |
| Layer_6 | Conv_Relu | 22:(1,256,56,56):INT8 | 5 | 26:(1,256,56,56):INT8 | 7 |
| Layer_7 | Conv_Relu | 26:(1,256,56,56):INT8 | 6 | 30:(1,256,56,56):INT8 | 8 |
| Layer_8 | Reshape | 30:(1,256,56,56):INT8 | 16;0 | 71:(1,802816):INT8;72:(4):INT8 | 10 |
| Layer_9 | FC_Relu | 71:(1,802816):INT8 | 17 | 76:(1,1000):INT8 | 19 |
| Layer_10 | Softmax | 76:(1,1000):INT8 | 22 | 88:(1,1000):INT8 | 24 |

Related U.S. Application Data continuation of application No. 16/541,878, filed on Aug. 15, 2019, now Pat. No. 11,526,736.

(51) Int. Cl.
*G06F 18/21* (2023.01)
*G06N 3/063* (2023.01)

(58) Field of Classification Search
CPC ....... G06N 5/04; G06F 9/5011; G06F 9/5044; G06F 18/217; G06F 9/505
USPC .......................................................... 706/26
See application file for complete search history.

(56) References Cited

U.S. PATENT DOCUMENTS

| | | | |
|---|---|---|---|
| 2019/0080019 | A1 | 3/2019 | Young et al. |
| 2019/0095796 | A1 | 3/2019 | Chen |
| 2019/0325296 | A1* | 10/2019 | Fowers .................. G06N 3/063 |
| 2019/0354850 | A1 | 11/2019 | Watson |
| 2020/0210840 | A1 | 7/2020 | Rouhani et al. |
| 2021/0248268 | A1* | 8/2021 | Ardhanari .............. G16H 10/60 |
| 2023/0289583 | A1* | 9/2023 | Driscoll ................. G06N 3/082 |

OTHER PUBLICATIONS

Levine, "Actor-Critic Algorithms," CS 294-112: Deep Reinforcement Learning, University of California-Berkeley, 28 pages.

Simonini, "An Intro to Advantage Actor Critic Methods: Let's Play Sonic the Hedgehog!" FreeCodeCamp, Jul. 26, 2018, retrieved from https://www.freecodecamp.org/news/an-intro-to-advantage-actor-critic-methods-lets-play-sonic-the-hedgehog-86d6240171d/, 8 pages.

Yoon, "Understanding Actor Critic Methods and A2C: Important Concepts in Deep Reinforcement Learning," Medium, Feb. 5, 2019, 13 pages.

Paliwal et al., "Regal: Transfer Learning for Fast Optimization of Computation Graphs," ARXIV.org, Cornell University Library, May 7, 2019, 12 pages.

EdgeCortix Inc., "Dynamic Neural Accelerator ™: Artificial Intelligence Processor for Edge Devices," EdgeCortix Inc. pamphlet, 2020, 2 pages.

European Patent Office, "Extended European Search Report," issued in connection with European Patent Application No. 20179887.3, issued on Dec. 8, 2020, 9 pages.

Nez et al., "Dynamic Neural Accelerator for Reconfigurable & Energy-efficient Neural Network Inference," EdgeCortix Inc. Presentation, 2021, 21 pages.

Demler, "Software is Critical to Edge-AI Deployment," The Linley Group, Sep. 2021, 9 pages.

United States Patent and Trademark Office, "Notice of Allowance and Fee(s) Due," issued in connection with U.S. Appl. No. 16/541,878, mailed on Aug. 9, 2022, 8 pages.

Nunes et al., "Compiling and Optimizing a Model with TVMC," TVM Tutorial, retrieved from https://tvm.apache.org/docs/tutorial/tvmc_command_line_driver.html#:-:text=Compiling%20and%200ptimizing%20a%20Model%20with%20TVMC%201, and%20Untuned%20Models%20 . . . %208%20Final%20Remarks%20, 8 pages.

European Patent Office, "Communication pursuant to Article 94(3) EPC," issued in connection with European Patent Application No. 20179887.3, dated Feb. 15, 2023, 5 pages.

United States Patent and Trademark Office, "Non-Final Office Action," issued in connection with U.S. Appl. No. 17/977,774, mailed on Mar. 14, 2023, 9 pages.

United States Patent and Trademark Office, "Notice of Allowance and Fee(s) Due," issued in connection with U.S. Appl. No. 17/977,774, mailed on Jul. 11, 2023, 7 pages.

European Patent Office, "Extended European Search Report," issued in connection with European Patent Application No. 23178001.6, dated Aug. 30, 2023, 10 pages.

United States Patent and Trademark Office, "Non-Final Action" issued in U.S. Appl. No. 16/863,157, on Nov. 14, 2023 (64 pages).

European Patent Office, "Communication pursuant to Article 94(3) EPC," issued in connection with European Patent Application No. 20 179 887.3, dated Sep. 26, 2024, 6 pages.

Zhang et al., "DNNBuilder: an automated tool for building high-performance DNN hardware accelerators for FPGAs," International Conference on Computer-Aided Design, Nov. 5, 2018, 9 pages.

European Patent Office, "Extended European Search Report," issued in connection with European Patent Application No. 24197216.5, dated Nov. 15, 2024, 6 pages.

\* cited by examiner

550

- Using linear value fn approx. $Q_w(s,a) = \phi(s,a)^T w$ ← 552
  Critic Updates $w$ by linear TD(0) ← 554
  Actor Updates $\theta$ by policy gradient
function QAC ← 556
  Initialize $s, \theta$
  Sample $a \sim \pi_\theta$ ← 558
  for each step do ← 560
    Sample reward $r = R_s^a$; sample transition $s' \sim P_s^a$
    Sample action $a' \sim \pi_\theta(s',a')$
    $\delta = r + \gamma Q_w(s',a') - Q_w(s,a)$ ← 562
    $\theta = \theta + \alpha \nabla_\theta \log \pi_\theta(s,a) Q_w(s,a)$ ← 564
    $w \leftarrow w + \beta \delta \phi(s,a)$
    $a \leftarrow a'; s \leftarrow s'$
  end for
end function

FIG. 5B

METHODS, SYSTEMS, ARTICLES OF MANUFACTURE AND APPARATUS TO MAP WORKLOADS

CROSS-REFERENCE TO RELATED APPLICATIONS

The present application is a continuation of U.S. Non-Provisional patent application Ser. No. 17/977,774, filed Oct. 31, 2022, which is a continuation of U.S. Non-Provisional patent application Ser. No. 16/541,878, filed Aug. 15, 2019. U.S. patent application Ser. No. 17/977,774 and U.S. patent application Ser. No. 16/541,878 are hereby incorporated by reference in their entireties.

FIELD OF THE DISCLOSURE

This disclosure relates generally to hardware allocation, and, more particularly, to methods, systems, articles of manufacture and apparatus to map workloads.

BACKGROUND

In recent years, artificial intelligence techniques, such as machine learning, deep learning, etc., have become more prevalent in solving problems and/or performing tasks, which include, but are not limited to image recognition, pattern recognition, autonomous vehicle navigation, protein folding analysis, etc. Such techniques employ different types of hardware resources to accomplish the various tasks.

BRIEF DESCRIPTION OF THE DRAWINGS

FIG. 5B is a portion of example pseudo code of an actor-critic reinforcement learning framework.

The figures are not to scale. In general, the same reference numbers will be used throughout the drawing(s) and accompanying written description to refer to the same or like parts.

Figure 1:
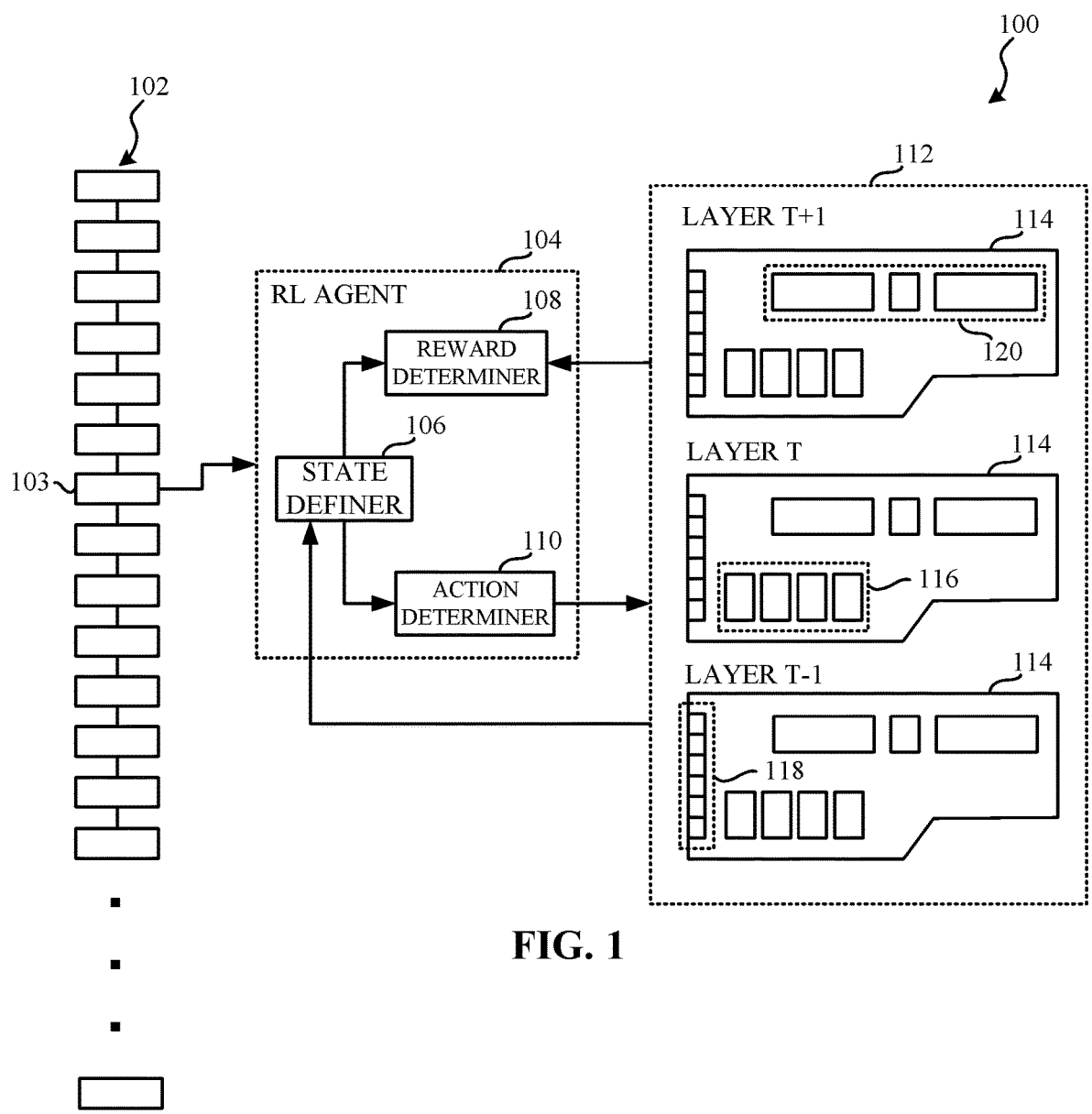
FIG. 1 is a schematic illustration of an example mapping process to map workloads in a manner consistent with the teachings of this disclosure.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Efforts to map a deep learning workload to resources (e.g., hardware) is a challenging and time-consuming task. Typically, personnel chartered with the responsibility of implementing a deep learning (DL) workload must analyze a neural network algorithm, break the neural network down into individual layers, apply configuration characteristics to each layer, and observe results (e.g., results from hardware resources, results from hardware simulators, etc.) of applying the characteristics to identify whether particular configuration characteristics should be used. Additionally, the personnel must select particular resources to accomplish computational tasks for each layer of a neural network. Resources include, but are not limited to computer processing units (CPUs), graphics processing units (GPUs), digital signal processors (DSPs), dedicated accelerators (e.g., matrix accelerators, matrix multiplication accelerators), inference computation engines (ICEs), systems on chip (SOCs), etc. Additionally, resources include different types of storage devices, such as particular types of memory (e.g., dynamic random-access memory (DRAM), scratchpad memory, last level cache (LLC), etc.).

While some known compilers provide a degree of automation to select resources for individual neural network layers, such compilers employ rule-based approaches and/or heuristics to make such selections. However, rule-based approaches fail to scale to deep learning neural networks as complexity increases. Indeed, mere application of heuristics is short-sighted in view of the vast number of permutations of layers, the vast number of corresponding resources and the vast number of corresponding memory device assignments for the respective layers. Such approaches are further constrained by the requirement of a human to evaluate trial-and-error results, and apply manual fine-tuning. Furthermore, discretionary errors are introduced when humans apply judgement to decisions regarding resource allocation on a layer-by-layer basis. Even where a human develops a particular skill set in making such layer-to-resource mappings, such skill sets are generally not transferrable to other personnel so that application can be applied in a predictable manner.

Examples disclosed herein employ reinforcement learning (RL) to compile neural networks in a manner that improves (e.g., optimizes) resource mappings on a layer-by-layer basis in view of particular improvement (e.g., optimization) objectives. In some examples disclosed herein, a latency constraint is identified as an improvement objective to improve (e.g., maximize). In response to receiving and/or otherwise retrieving a neural network input, resource mappings are assigned for each layer of the neural network to form an output mapping framework that can be applied to a compiler. As such, the output mapping framework generated by examples disclosed herein overrides any default mapping strategy(ies) employed by the compiler (e.g., rule-based mappings, heuristics, etc.) to cause improved (e.g., optimized) performance of the neural network when measured against the particular improvement (e.g., optimization) objectives. However, examples disclosed herein are not limited to a single improvement (e.g., optimization) objective, but identify resource mappings on a layer-by-layer basis in connection with any number of improvement objectives (e.g., lower latency, faster throughput, lower power consumption, etc.).

Artificial intelligence (AI), including machine learning (ML), deep learning (DL), neural networks (NNs), deep NNs, convolutional NNs (CNNs), and/or other artificial machine-driven logic, enables machines (e.g., computers, logic circuits, etc.) to use a model to process input data to generate an output based on patterns and/or associations previously learned by the model via a training process. For instance, the model may be trained with data to recognize patterns and/or associations and follow such patterns and/or associations when processing input data such that other input(s) result in output(s) consistent with the recognized patterns and/or associations.

Many different types of machine learning models and/or machine learning architectures exist. In examples disclosed herein, a reinforcement model (reinforcement learning) is used. Using a reinforcement model enables behaviors (e.g., arbitrary behaviors) to play-out scenarios such that an agent can identify how to act/perform in an effort to improve (e.g., maximize) a reward (or reduce (e.g., minimize) a punishment). As used herein, an agent is a representation (e.g., an executable) of the influence of making a change, such as a network directive that, when executed, causes particular hardware performance activity and/or a change in state. In general, machine learning models/architectures that are suitable to use in the example approaches disclosed herein will be reinforcement learning techniques. However, other types of machine learning models/techniques could additionally or alternatively be used.

In general, implementing a ML/AI/DL system involves two phases, a learning/training phase and an inference phase. In the learning/training phase, a training algorithm is used to train a model to operate in accordance with patterns and/or associations based on, for example, training data. In general, the model includes internal parameters that guide how input data is transformed into output data, such as through a series of nodes and connections within the model to transform input data into output data. Additionally, in some examples hyperparameters are used as part of the training process to control how the learning is performed (e.g., a learning rate, a number of layers to be used in the machine learning model, a discount factor, etc.). Hyperparameters are defined to be training parameters that are determined, for example, prior to initiating the training process.

Different types of training may be performed based on the type of ML/AI/DL model/technique and/or the expected output. For example, supervised training uses inputs and corresponding expected (e.g., labeled) outputs to select parameters (e.g., by iterating over combinations of select parameters) for the ML/AI/DL model that reduce model error. Generally speaking, supervised learning/training is particularly useful when predicting values based on labeled data. As used herein, labelling refers to an expected output of the machine learning model (e.g., a classification, an expected output value, etc.) Alternatively, unsupervised training/learning (e.g., used in deep learning, a subset of machine learning, etc.) involves inferring patterns from inputs to select parameters for the ML/AI/DL model (e.g., without the benefit of expected (e.g., labeled) outputs). Generally speaking, unsupervised learning is particularly useful when attempting to identify relationships in unlabeled data.

In examples disclosed herein, ML/AI/NN/DL models are trained using reinforcement learning. However, any other training algorithm/technique may additionally or alternatively be used. In examples disclosed herein, training is performed until convergence, which is aided through the use of neural networks. Training is performed using hyperparameters that control how the learning is performed (e.g., a learning rate, a number of layers to be used in the machine learning model, etc.). In examples disclosed herein, hyperparameters that control the discount factor enable different degrees of learning experimentation and attempts to "try." Such hyperparameters are selected by, for example, empirical observation, time constraints, etc. In some examples re-training may be performed.

For some ML/AI/NN/DL approaches, training is performed using training data. In examples disclosed herein, the training data originates from a code corpus of code samples deemed to be particularly useful and error free (e.g., industry standard code). Because supervised training may be used, the training data is labeled. However, labelled data may also be useful in reinforcement learning to provide additional states and/or corresponding actions of particular code functions.

In some examples, once training is complete, the model is deployed for use as an executable construct that processes an input and provides an output based on the network of nodes and connections defined in the model. The model is stored at local storage devices (e.g., databases) and/or network-accessible storage devices (e.g., cloud-based storage services).

Once trained, the deployed model may be operated in an inference phase to process data. In the inference phase, data to be analyzed (e.g., live data) is input to the model, and the model executes to create an output. This inference phase can be thought of as the AI (e.g., an ML model) "thinking" to generate the output based on what it learned from the training (e.g., by executing the model to apply the learned patterns and/or associations to the live data). In some examples, input data undergoes pre-processing before being used as an input to the machine learning model. Moreover, in some examples, the output data may undergo post-processing after it is generated by the model (e.g., ML model) to transform the output into a useful result (e.g., a display of data, an instruction to be executed by a machine, etc.).

In some examples, output of the deployed model may be captured and provided as feedback. By analyzing the feedback, an accuracy of the deployed model can be determined. If the feedback indicates that the accuracy of the deployed model does not satisfy (e.g., is less than) a threshold or fails to satisfy some other criterion, training of an updated model can be triggered using the feedback and an updated training data set, hyperparameters, etc., to generate an updated, deployed model.

FIG. 1 illustrates a portion of an example mapping process 100. In the illustrated example of FIG. 1, the mapping process 100 includes a neural network 102 having any number of layers, in which a layer of interest 103 is shown as a current layer being analyzed (layer "t"). The illustrated example of FIG. 1 also includes an example reinforcement learning (RL) agent 104, which includes an example state definer 106, an example reward determiner 108, and an example action determiner 110. The illustrated example of FIG. 1 also includes example resources 112. The example resources 112 of FIG. 1 include a circuit board 114 having any number and/or type of resources thereon, such as an example CPU, an example GPU, example logic analyzers, example accelerators, etc. In some examples, a platform and/or other communicatively connected resources are scanned to perform an audit of available hardware and/or hardware simulators that can be used to execute the neural network and/or layers therein. While the illustrated example of FIG. 1 includes a physical circuit board 114 (e.g., a printed circuit board (PCB)), examples disclosed herein are not limited thereto.

In the illustrated example of FIG. 1, the circuit board 114 is associated with the current layer of the neural network being analyzed (layer "t"), in which the example RL agent 104 has determined to employ a first resource 116 for layer "t." However, at a prior iteration of the example RL agent 104, a prior layer of the neural network 102 was analyzed (layer "t−1") in which the example RL agent 104 has determined to employ a second resource 118 of the example circuit board 114. Additionally, at a subsequent iteration of the example RL agent 104, a subsequent layer of the neural network 102 may be analyzed (layer "t+1") in which the example RL agent 104 may be determined to employ a third resource 120 of the example circuit board 114. While the illustrated example of FIG. 1 includes layers t, t−1 and t+1 occurring in a temporal sequence of adjacent layers, examples disclosed herein are not limited thereto. For instance, one or more layers may be analyzed in any order and/or an order that is not sequential with adjacent layer(s). Generally speaking, the illustrated example of FIG. 1 shows that the example circuit board 114 may have any number of different/unique resources thereon, and examples disclosed herein identify which ones of those unique resources best improve (e.g., optimize) respective layers of the neural network 102. The set of resources that best improves one layer may be completely different from the set of resources that improves another layer.

Figure 2:
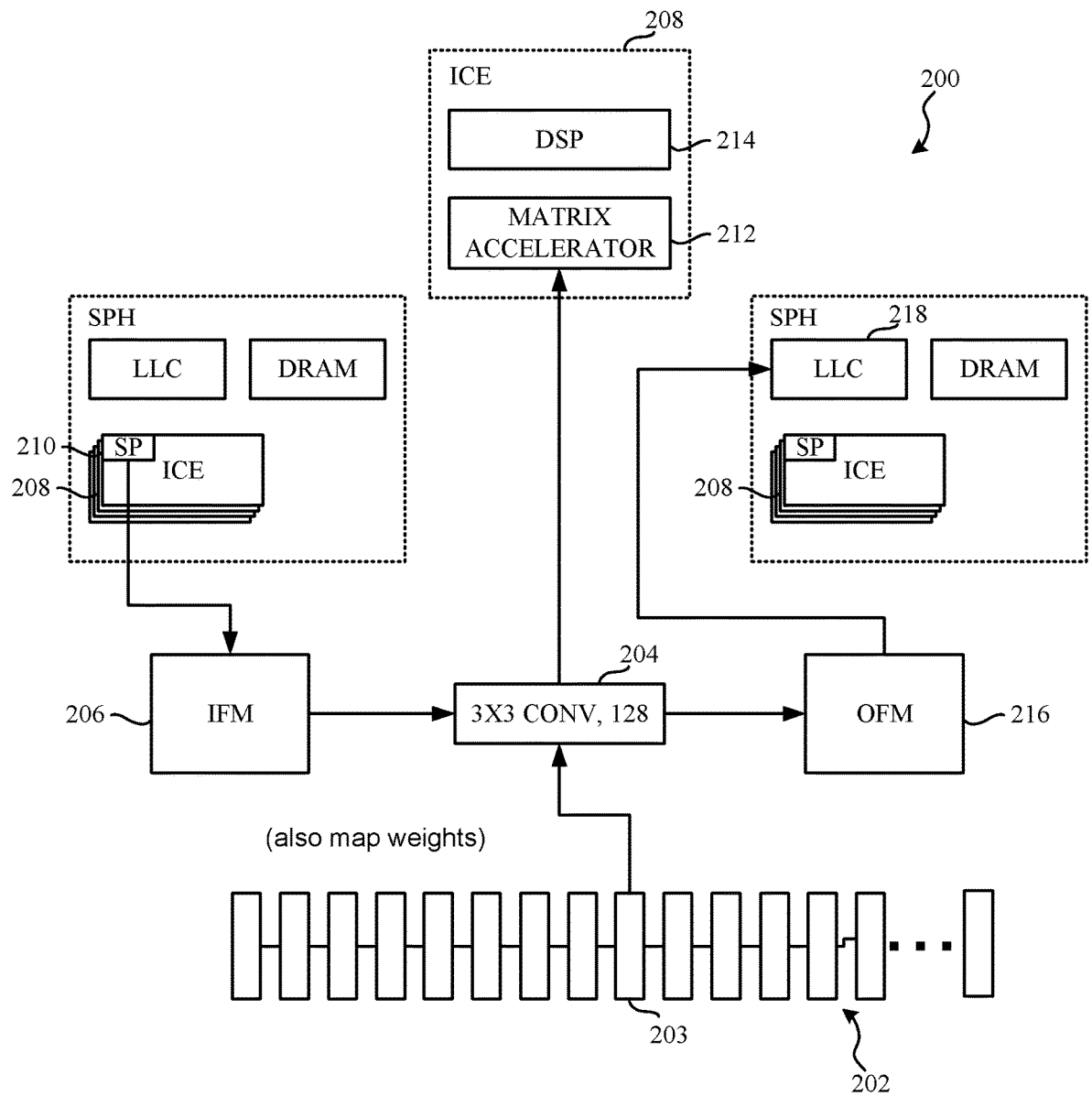
FIG. 2 is a schematic illustration of another example mapping process to map workloads in a manner consistent with the teachings of this disclosure.

FIG. 2 illustrates another portion of an example mapping process 200. In the illustrated example of FIG. 2, the mapping process 200 includes a neural network 202 having any number of layers, in which a layer of interest 203 is shown as a 3×3 convolution layer (a convolution operator) 204 being analyzed. An RL agent, such as the example RL agent 104 of FIG. 1, propagates (e.g., evaluates, executes, simulates, etc.) through the example neural network 202 layer by layer to map memory, weights, and computational resources for each layer of interest. As described in further detail below, the mapping is based on previous layer mappings, remaining utilization capabilities of the resources, and cost/reward function results. In the illustrated example of FIG. 2, an example input feature map (IFM) 206, which includes tensor (e.g., vector space object) dimensions, is mapped to an ICE block 208. In the illustrated example of FIG. 2, the example ICE block 208 includes an example matrix accelerator 212 (e.g., hardware circuitry) and an example digital signal processor (DSP) 214 (e.g., hardware circuitry). More specifically, the example IFM 204 is mapped to a scratchpad (SP) memory 210 of the example IFM 206. The example mapping process 200 of FIG. 2 also illustrates the convolution operator 204 (e.g., hardware circuitry) mapped to the example matrix accelerator 212 of the example ICE block 208, and that an example output feature map (OFM) 216, which includes tensor dimensions, is mapped to an example last level cache 218. However, other candidate layers of the example neural network 202 may utilize different hardware and/or memory for the example convolution operator 2014, the example IFM 206, and/or the example OFM 216.

Figure 3:
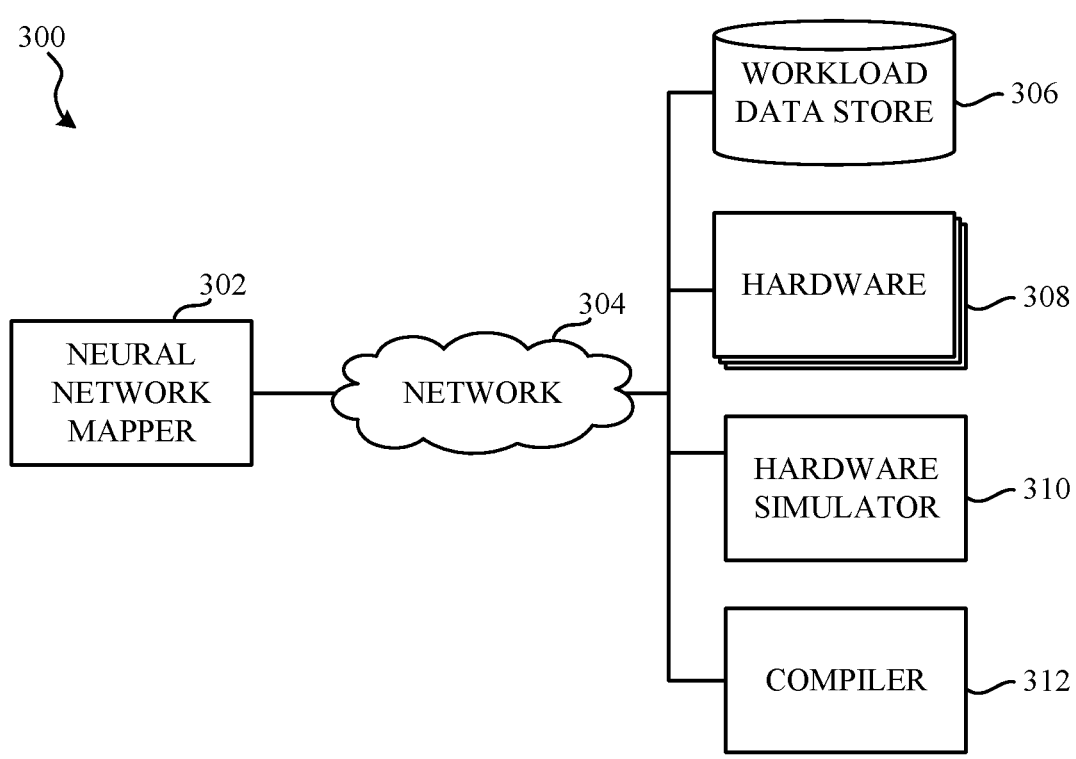
FIG. 3 is a schematic illustration of an example system to map workloads in a manner consistent with the teachings of this disclosure.

FIG. 3 illustrates an example system 300 to map workloads (e.g., tasks to be completed by a neural network). In the illustrated example of FIG. 3, the system 300 includes an example neural network (NN) mapper 302 communicatively connected to an example network 304 to facilitate communication and/or control with/over an example workload data store 306, example hardware 308, an example hardware simulator 310, and an example compiler 312. In some examples, the system includes both example hardware 308 and the example hardware simulator 310, while in some examples the system includes one or the other. In some examples, the hardware 308 is implemented by one or more hardware circuits (e.g., the example ICE 208, the example resources 112, the example circuit board 114, etc.). In some examples, the hardware simulator 310 is implemented by one or more processors. In some examples, the compiler is implemented by one or more processors. In some examples, the neural network mapper scans the example network 304 and/or a platform communicatively connected to the network 304 to identify candidate resources that could execute the target neural network (e.g., the example hardware 308 and/or the example hardware simulator 310). In some examples, the NN mapper 302 is directly connected to one or more of the aforementioned structures of the example system 300 without any need for the example network 304. In some examples, the network 304 includes an intranet, the Internet, a local area network (LAN), a wide area network (WAN), etc. As described above, the example hardware 308 may include any number and/or types of resource, such as physical hardware (e.g., CPUs, GPUs, accelerators, etc.) and/or virtual machines (VMs). In some examples, when physical hardware is unavailable, the example hardware simulator 310 simulates hardware on a layer-by-layer basis. In response to the example NN mapper 302 evaluating a layer of a NN, the example NN mapper 302 generates and/or updates a mapping file. As described in further detail below, the mapping file includes specific resource assignments on a layer-by-layer basis, which is provided to the example compiler 312. While some compilers utilize one or more different techniques to assign resources to NN layers, examples disclosed herein generate improved (e.g., optimized) resource assignments and facilitate compiler override instructions to bypass and/or otherwise prevent such conventional resource assignments from being implemented. Instead, examples disclosed herein employ the example mapping file to control and/or otherwise direct the resource assignment activities of the example compiler 312.

Figure 4:
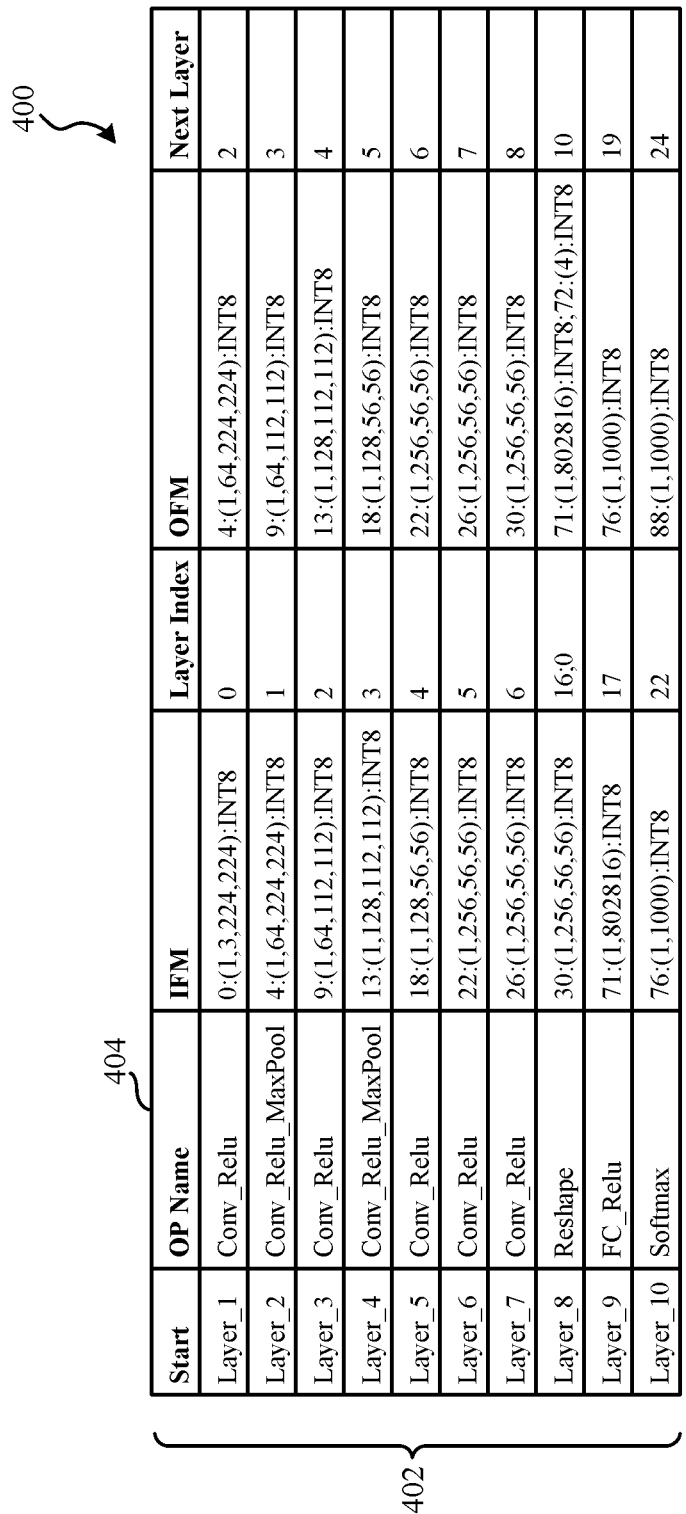
FIG. 4 illustrates an example neural network input model to be analyzed by the example mapping process of FIGS. 1 and/or 2, and/or the example system of FIG. 3.

In operation, the example NN mapper 302 retrieves and/or otherwise receives a NN model from the example workload data store 306. The example NN model may be in a device agnostic format, such as the Open Neural Network eXchange (ONNX) format to represent deep learning models. FIG. 4 illustrates an example NN input model 400 having information associated with respective layers of the model 400. In the illustrated example of FIG. 4, the NN input model 400 includes rows corresponding to respective layers 402 of the NN input model 400. The example NN input model 400 of FIG. 4 also identifies particular operator types 404 (e.g., rectified linear units (ReLUs), Reshape, Softmax, etc.), tensor size information, layer hierarchy information, etc.

Returning to the illustrated example of FIG. 3, the NN mapper 302 evaluates a neural network on a layer-by-layer basis. To do so, the candidate layers are executed by the example hardware 308 (or the example hardware simulator 310) with a different combination of hardware elements (e.g., processing devices, memory devices, circuits, etc.) on a layer by layer basis. For each layer, one combination of hardware elements will exhibit a relatively improved (e.g., optimum) performance metric that is saved as a final resource directive for that particular layer being analyzed. In other words, different resource configurations are compared based on their relative scores, and the best score is deemed "optimum." When a current layer is finished being analyzed (e.g., based on a threshold number of attempted hardware configurations, based on detection of a convergence indicator, etc.), the example NN mapper 302 moves on to analyzing a next layer of the neural network, and so on until each layer has been analyzed as an "optimim" resource configuration has been identified for each layer.

Figure 5A:
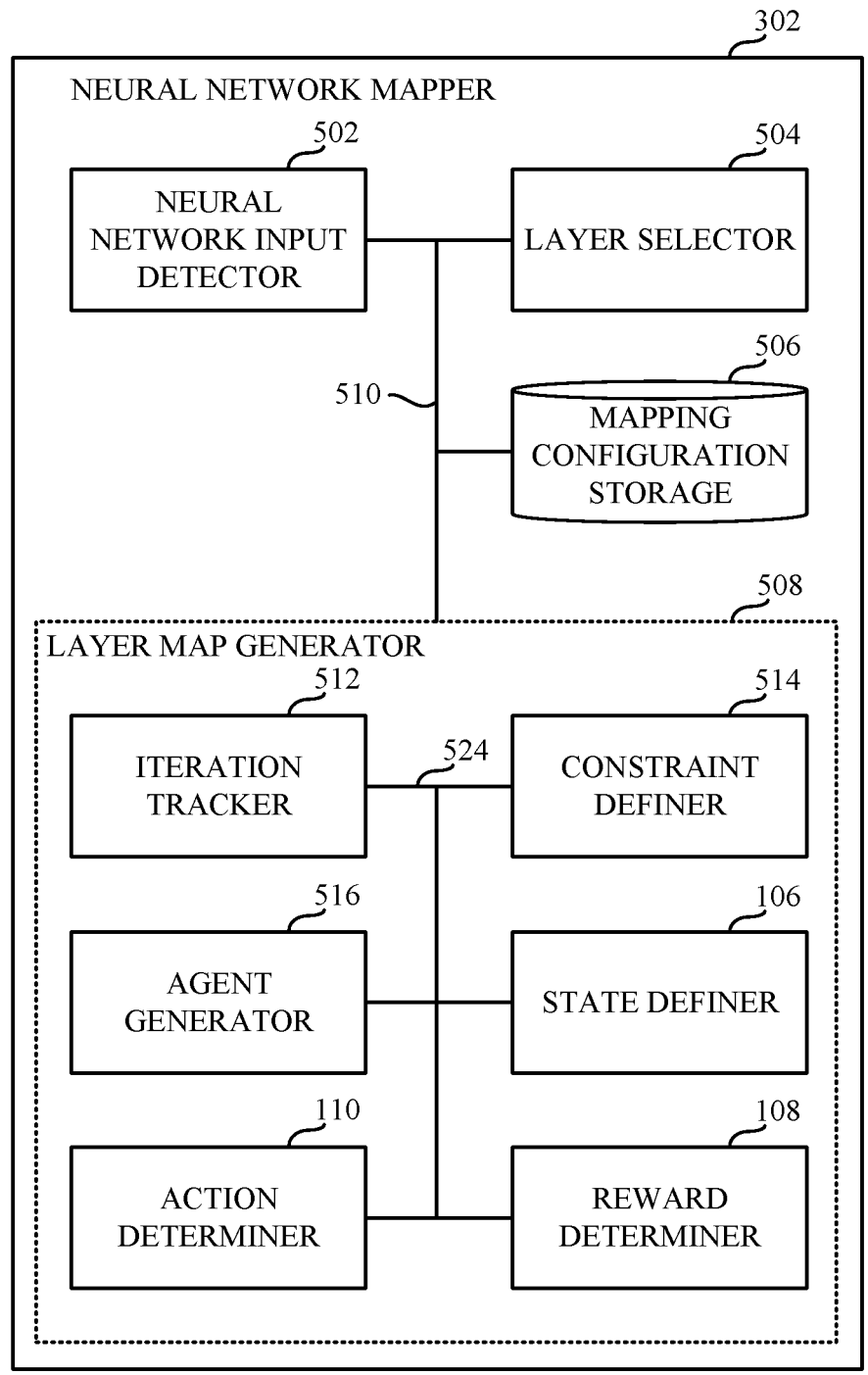
FIG. 5A is a schematic illustration of an example implementation of the neural network mapper of FIG. 3.

FIG. 5A is a schematic illustration of the example NN mapper 302 of FIG. 3. In the illustrated example of FIG. 5A, the NN mapper 302 includes an example NN input detector 502, an example layer selector 504, an example mapping configuration storage 506, and an example layer map generator 508. The aforementioned structures are communicatively connected via an example NN mapper bus 510. The example layer map generator 508 includes an example iteration tracker 512, an example constraint definer 514, an example agent generator 516, the example state definer 106, the example action determiner 110, and the example reward determiner 108. The aforementioned structures of the example layer map generator 508 are communicatively connected via an example layer map generator bus 524. In some examples, all structures within the illustrated example of FIG. 5A is communicatively connected via the example NN mapper bus 510 and/or the example layer map generator bus 524, without limitation. These structures may be implemented by circuitry.

In some examples, the constraint definer 514 implements means for performance characteristic defining. The performance characteristic defining means may be implemented by a processor, such as the processor 1012 of FIG. 10 executing instructions, such as the instructions of FIGS. 8 and/or 9. In some examples, the action determiner 110 implements means for action applying. The action applying means may be implemented by the processor 1012 of FIG. 10 executing instructions, such as the instructions of FIGS. 8 and/or 9. In some examples, the reward determiner 108 implements the means for results calculating. The results calculating means may be implemented by the processor 1012 of FIG. 10 executing instructions, such as the instructions of FIGS. 8 and/or 9. In some examples, the layer map generator 508 implements the means for map generating. The map generating means may be implemented by the processor 1012 of FIG. 10 executing instructions, such as the instructions of FIGS. 8 and/or 9. In some examples, the neural network mapper 302 implements the means for neural network mapping. The neural network mapping means may be implemented by the processor 1012 of FIG. 10 executing instructions, such as the instructions of FIGS. 8 and/or 9. In some examples, the layer selector 504 implements the means for layer selection. The layer selection means may be implemented by the processor 1012 of FIG. 10 executing instructions, such as the instructions of FIGS. 8 and/or 9. In some examples, the state definer implements the means for state defining. The state defining means may be implemented by the processor 1012 of FIG. 10 executing instructions, such as the instructions of FIGS. 8 and/or 9.

In operation, the example NN input detector 502 determines whether a NN input model has been received. As described above, examples disclosed herein evaluate a NN model, such as the device agnostic model 400 shown in the illustrated example of FIG. 4. In response to a NN analysis request, the example layer selector 504 selects one of any number of layers associated with the received and/or otherwise retrieved NN model. As described above, each layer of a NN model can utilize particular resources in a manner that best satisfies desired operating characteristics of the NN model. For instance, selecting a first processing circuit (e.g., an element, such as a CPU) for a first layer may exhibit improved performance characteristics over a second processing circuit (e.g., a matrix accelerator). However, selecting that same first processing circuit for a second layer may not necessarily exhibit improved (e.g., optimized) performance characteristics. As such, examples disclosed herein evaluate each layer in view of a particular combination of desired performance characteristics with which to improve (e.g., maximize).

The example iteration tracker 512 determines whether the selected layer of interest has been evaluated on a prior occasion and, if not, the example constraint definer 514 defines resource constraints to be associated with the selected layer of interest. As used herein, resource constraints, performance characteristics and performance characteristic targets are referred-to interchangeably and are metrics that can be improved when particular resources (e.g., processing resources, memory resources) are utilized with particular ones of layers in a neural network. Resource constraints to be defined include, but are not limited to improved (e.g., maximized) throughput metrics, improved (e.g., maximized) response time (e.g., latency) metrics, reduced (e.g., minimized) power metrics, and/or non-continuous weight values for respective constraints to be applied in one or more reward/cost functions (sometimes referred to herein as a value function). Examples disclosed herein employ actor-critic reinforcement learning (RL) to converge permutations of an action space that, in some examples, is too large for reasonable human processing. As used herein, the action space includes a particular number of combinations of hardware selections and/or memory selections for respective layers in a NN.

The example reward function may, for example, seek to improve (e.g., maximize) a throughput metric in connection with compute, memory and latency constraints. In some examples, the reward function considers mutual interactions between particular actions and mappings of previously analyzed layers of the deep NN. As used herein, the actor-critic RL framework includes a critic (e.g., reward determiner) to evaluate the merits of an action (e.g., how good an action is to take), and updates action-value parameters to seek and/or otherwise suggest by an actor (e.g., action determiner). As used herein, the actor instructs a particular action and updates policy parameters as suggested by the example critic. The actor may, for example, map a layer to a particular memory location (e.g., SRAM, LLC, DDR, etc.), map the layer to a particular processor (e.g., a matrix accelerator, a DSP, a CPU, etc.) and/or identify a particular core of a multi-core system. In some examples, the critic identifies parameters to guide a degree of candidate action exploration rather than merely attempting to execute all possible permutations of an action space, which would be computationally and temporally expensive.

FIG. 5B illustrates pseudo code of an example actor-critic RL framework 550. Other inputs to the actor-critic RL framework include state values, such as current layer parameters associated with the IFM, the OFM, a kernel size of the layer of interest, an amount of remaining (e.g., available) memory, memory bandwidth capability information and/or mapping information associated with previous layers of the deep NN. The example actor-critic RL framework 550 includes two parameters to be learned, a first of which is parameters from an actor (θ) and a second of which is parameters from a critic (w). The framework employs an approximation of a Q value function and an approximation of a policy gradient (π). In the illustrated example of FIG. 5B, line 552 illustrates that Q is approximated linearly, in which W represents the weights and (ϕ) represents input features associated to the state (s) and the action (a). Line 554 illustrates updating the weights of the critic by using a temporal difference (TD) learning method TD(0). Line 556 represents a function of Q Actor Critic (QAC) to perform approximation. Line 558 represents an action (a) sampled according to (π) that is initialized in a manner consistent with the preceding line.

Line 560 represents a for loop that, in view of a previous state and corresponding reward, determines a new state (s') according to a state transition probability (P). A new action (a') is then sampled by the policy parametrized by teta. Line 562 represents an update of the critic and the actor, in which a TD error is calculated as the difference between (r+gamma*Q)=actual Q and an expected Q value. Line 564 represents an update of the parameters of the critic. While the example actor-critic RL framework 550 of FIG. 5B includes the aforementioned example lines of pseudo code, examples disclosed herein are not limited thereto in which alternate variants of an RL framework may be considered.

During a first iteration of the actor-critic RL framework for the selected layer of interest, because no prior mapping permutations have been attempted, the example constraint definer 514 identifies a heuristic and/or rule-based mapping configuration. For example, the constraint definer 514 may utilize a greedy algorithm to make a resource mapping selection that employs the fastest available processing device and a memory device having the lowest relative latency. While some applications of the greedy algorithm may exhibit desired performance characteristics, simple application of the greedy algorithm may cause particular problems. For instance, in the event the memory having the lowest latency is selected, but that memory is also near full capacity, then such a selection causes future bottlenecks and relatively poor results. Nonetheless, applying the heuristic and/or rule-based mapping configuration serves as a helpful starting point for the actor-critic RL framework. In particular, such a starting point allows the generation of a reward calculation with performance data, which allows the RL framework to iterate with alternate mapping permutations that are guided by the performance characteristics. Stated differently, the RL framework benefits from poor mapping choices to guide future mapping configuration permutations to attempt.

The example agent generator 516 generates a reinforcement learning agent (e.g., the example RL agent 104 of FIG. 1) (e.g., a container for the example state definer 106, the example reward determiner 108 and the example action determiner 110). The example state definer 106 generates a current state ($S_t$) representation based on the selected heuristics/rules and prior layer state information, if any, in which t reflects the selected layer of interest. In some examples, the current state is represented in a manner consistent with example Equation 1.

$$S_t=(\text{IFM},\text{OFM},\text{BW},\text{MEM},\text{UTIL},\text{LATENCY}) \quad \text{Equation 1.}$$

In the illustrated example of Equation 1, IFM refers to the input feature map (having tensor dimensions), OFM refers to the output feature map (having tensor dimensions), BW refers to a memory bandwidth metric (e.g., in Gigabits per second (GB/s)), MEM refer to a memory capacity metric (e.g., in Megabits (MB)), UTIL refers to a vector of a hardware component utilization for the selected layer of interest (e.g., a 5% utilization of a DSP, a 50% utilization for an accelerator, a 20% utilization for a CPU, etc.), and LATENCY refers to a latency metric for the layer of interest.

The example action determiner 110 applies the mapping configuration (based on the heuristics/rules) to the example resources 112 so that state data may be generated. As the generated state data results from every permutation of resources applied to the selected layer of interest, relative performance capabilities can be realized when comparing respective instances of the state data. In some examples, results from each iteration of applied resources (either actual physical resources 308 or simulated hardware 310) are stored in the example mapping configuration storage 506.

Figure 6:
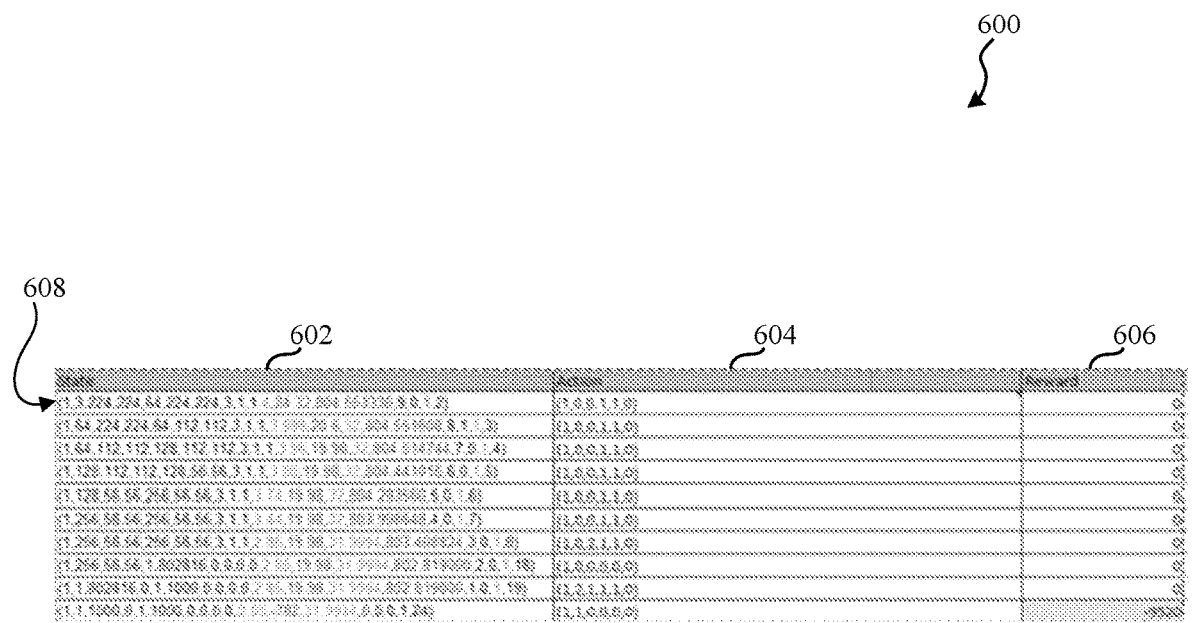
FIG. 6 is an example state report generated by the example neural network mapper of FIGS. 3 and 5A.

In response to at least one iteration of the example layer map generator 508 applying a particular combination of resources, the example state definer 106 updates the state metrics of the mapping effort. FIG. 6 illustrates an example state report 600 generated by the example state definer 106. In the illustrated example of FIG. 6, the state report 600 includes embedded state information associated with the layers 602, actions most recently taken 604 and corresponding results 606 (e.g., metrics calculated from the reward function). For instance, an example first row 608 illustrates an array of integer values indicative of different state details (1, 3, 224, 224, etc.). A first integer may indicate a first batch (1), a second integer may indicate a number of input channels (3), third and fourth integers may indicate an image size (224×224), etc. The example reward determiner 108 evaluates the metrics in connection with one or more reward functions. In some examples, the reward determiner 108 calculates a results metric that is based on measured performance metrics and corresponding performance characteristic targets. Such results metric data is used on a relative comparison basis to determine which particular resource assignments exhibit the relatively best (e.g., optimized) performance as compared to the other resource assignments. The reward determiner 108 generates an iteration decision based on the results metric. In the event the example reward determiner 108 determines that additional resource mapping iterations should occur (e.g., the iteration decision indicates at least one more hardware configuration permutation to try), the example action determiner 110 updates resource mapping directives and applies those directives to a subsequent mapping configuration to be tested. In some examples, the reward determiner 108 identifies an indication of convergence to signal when iterations of the actor-critic RL framework should cease, while in some examples the reward determiner 108 conducts a threshold number of iterations.

In response to the action determiner 110 determining that no further iterations are needed (e.g., a threshold degree of convergence has been detected by the example action determiner 110), the example layer map generator 508 stores the mapping configurations for the selected layer in the example mapping configuration storage 506. The example layer selector 504 determines whether additional layers still require analysis and, if so, the example layer selector 504 selects the next layer in the example NN.

Figure 7:
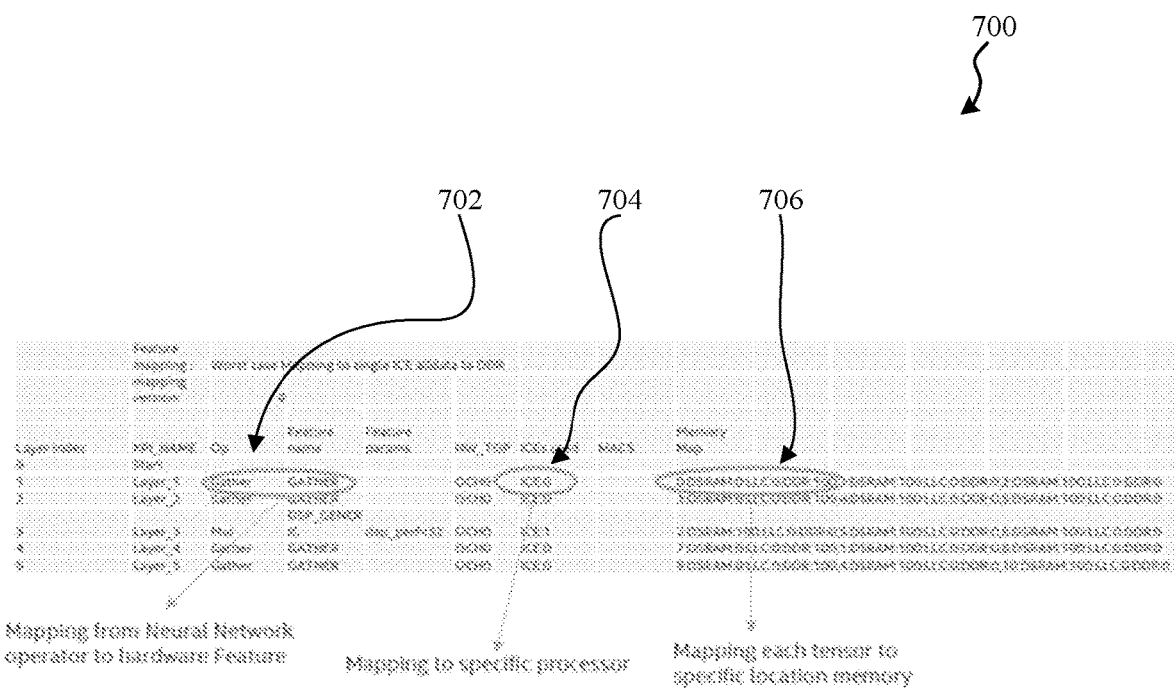
FIG. 7 is an example mapping file generated by the example neural network mapper of FIGS. 3 and 5A.

On the other hand, in the event the example layer selector 504 determines that all layers of the NN have been analyzed, the example layer map generator 508 generates a mapping file for the NN. FIG. 7 illustrates an example mapping file 700, sometimes referred to herein as a resource map. In the illustrated example of FIG. 7, the mapping file 700 includes a first mapping of a particular layer and a corresponding hardware feature 702. The example mapping file 700 also includes a mapping of that same layer to a particular inference computation engine (ICE) processor 704, such as one of any number of devices on the ICE (e.g., a particular accelerator, a particular DSP, etc.). The example mapping file 700 also includes a mapping of that same layer to a particular memory and/or memory location to which layer tensors are to be mapped 706. While the illustrated example of FIG. 7 includes five (5) layers of a NN, examples disclosed herein are not limited thereto. After the example layer map generator 508 completes building and/or otherwise generating the example mapping file 700, the example NN mapper 302 overrides one or more directives of the example compiler 312 that are associated with resource selection. Stated differently, because the example mapping file 700 includes particular resources for each layer that are selected based on improving (e.g., optimizing) one or more reward functions of an actor-critic RL framework, such mappings cause improved performance of the NN on such hardware resources when compared to shortsighted heuristics and/or rule-based selections of the example compiler 312.

While an example manner of implementing the neural network mapper 302 of FIG. 3 is illustrated in FIGS. 3 and 5A, one or more of the elements, processes and/or devices illustrated in FIGS. 3 and/or 5A may be combined, divided, re-arranged, omitted, eliminated and/or implemented in any other way. Further, the example neural network input detector 502, the example layer selector 504, the example layer map generator 508, the example iteration tracker 512, the example constraint definer 514, the example agent generator 516, the example state definer 106, the example action determiner 110, the example reward determiner 108 and/or, more generally, the example neural network mapper 302 of FIG. 5A, the example mapping process 100 of FIG. 1, the example mapping process 200 of FIG. 2, and/or the example system 300 of FIG. 3 may be implemented by hardware, software, firmware and/or any combination of hardware, software and/or firmware. Thus, for example, any of the example neural network input detector 502, the example layer selector 504, the example layer map generator 508, the example iteration tracker 512, the example constraint definer 514, the example agent generator 516, the example state definer 106, the example action determiner 110, the example reward determiner 108 and/or, more generally, the example neural network mapper 302 of FIG. 5A, the example mapping process 100 of FIG. 1, the example mapping process 200 of FIG. 2, and/or the example system 300 of FIG. 3 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example neural network input detector 502, the example layer selector 504, the example layer map generator 508, the example iteration tracker 512, the example constraint definer 514, the example agent generator 516, the example state definer 106, the example action determiner 110, the example reward determiner 108 and/or, more generally, the example neural network mapper 302 of FIG. 5A, the example mapping process 100 of FIG. 1, the example mapping process 200 of FIG. 2, and/or the example system 300 of FIG. 3 is/are hereby expressly defined to include a non-transitory computer readable storage device or storage disk such as a memory, a digital versatile disk (DVD), a compact disk (CD), a Blu-ray disk, etc. including the software and/or firmware. Further still, the example neural network mapper 302 of FIGS. 3 and 5A may include one or more elements, processes and/or devices in addition to, or instead of, those illustrated in FIGS. 1-3, and 5A, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 8:
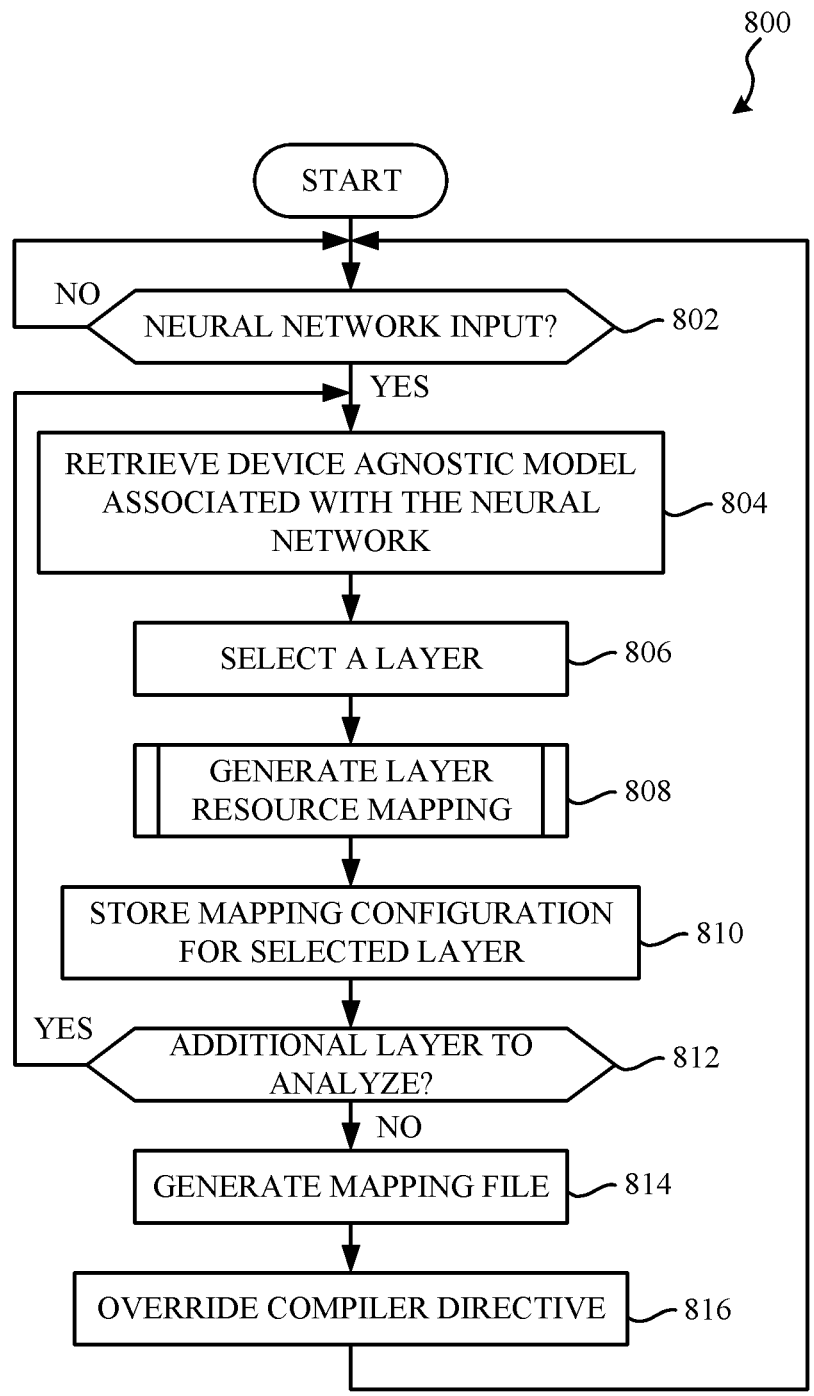
FIGS. 8 and 9 are flowcharts representative of machine readable instructions which may be executed to implement the example mapping processes of FIGS. 1 and/or 2, and/or to implement the example system of FIG. 3, and/or to implement the example neural network mapper of FIGS. 3 and 5A.
Figure 9:
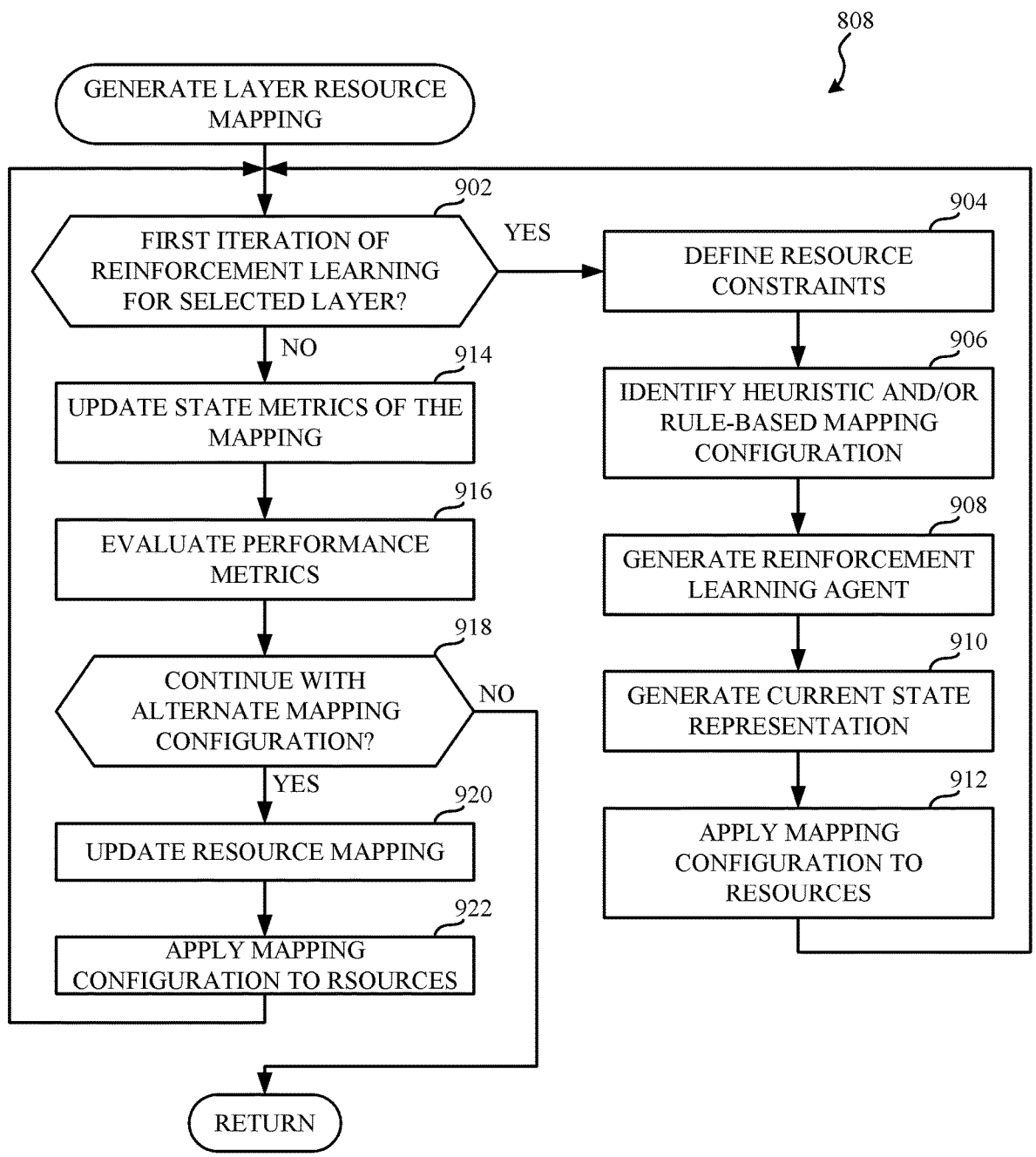

Flowcharts representative of example hardware logic, machine readable instructions, hardware implemented state machines, and/or any combination thereof for implementing the neural network mapper 302 of FIGS. 3 and/or 5A are shown in FIGS. 8 and 9. The machine readable instructions may be one or more executable programs or portion(s) of an executable program for execution by a computer processor such as the processor 1012 shown in the example processor platform 1000 discussed below in connection with FIG. 10. The program(s) may be embodied in software stored on a non-transitory computer readable storage medium such as a CD-ROM, a floppy disk, a hard drive, a DVD, a Blu-ray disk, or a memory associated with the processor 1012, but the entire program(s) and/or parts thereof could alternatively be executed by a device other than the processor 1012 and/or embodied in firmware or dedicated hardware. Further, although the example program is described with reference to the flowcharts illustrated in FIGS. 8 and 9, many other methods of implementing the example neural network mapper 302 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 8 and 9 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

The program 800 of FIG. 8 includes block 802, where the example neural network input detector 502 determines whether a neural network input has been retrieved and/or otherwise received. In some examples, the neural network input detector 502 detects a request to process a neural network, and then retrieves a device agnostic model associated with the neural network (block 804). As described above, the device agnostic model may be retrieved in a manner consistent with the example model 400 of FIG. 4. Because the NN model typically has two or more layers, the example layer selector 504 selects a layer so that model analysis can occur on a layer-by-layer basis (block 806). The example layer map generator 508 generates a layer resource mapping that is unique to the selected layer of the network (block 808), as described in further detail below in connection with FIG. 9.

FIG. 9 illustrates additional detail associated with generating a layer resource mapping of block 808 of FIG. 8. In the illustrated example of FIG. 9, the example iteration tracker 512 determines if a first iteration of reinforcement learning is occurring for the selected layer (block 902). If so, then a seed configuration is needed, as well as a definition of constraints for the selected layer of interest and/or particular targeted performance objectives for the model. For instance, respective layers of a neural network may have different processing needs and/or memory storage needs, which should be accommodated and/or otherwise satisfied to allow the layer to complete its corresponding computing objectives. As such, the example constraint definer 514 defines resource constraints (block 904). As described above, any number and/or type of resource constraints and/or objectives may be defined, such as a maximum throughput objective, a minimum latency objective, a minimum power consumed objective, etc. Because this is a first iteration, the example constraint definer 514 also identifies a heuristic and/or rule-based mapping configuration for the target hardware (block 906).

The example agent generator 516 generates a reinforcement learning (RL) agent (block 908) (e.g., see the example RL agent 104 of FIG. 1). Additionally, the example state definer 106 generates a current state ($S_t$) representation that is based on the heuristics/rules and prior layer state information, if any (block 910). The example action determiner 110 applies the mapping configuration to the available/candidate resources 112 (block 912) so that an execution iteration of the selected layer can occur. Stated differently, because this is the first iteration of layer execution using a heuristically or rule-based configuration of hardware and/or memory, performance of the layer is not likely to meet and/or otherwise satisfy the optimum metrics sought. However, while poor resource configuration settings do not necessarily result in improved (e.g., optimized) performance metrics of the selected layer, because reinforcement learning is applied in view of the performance goals, the RL process can learn from bad decisions.

During subsequent iterations of the example program 808 of FIG. 9, the example iteration tracker 512 determines that prior iterations have already occurred (block 902). If so, then the example state definer 106 updates state metrics of the mapping (block 914) and the example reward determiner 108 evaluates performance metrics of the mapping (block 916). In other words, the example reward determiner 108 determines how well or how poorly the mapping performed in view of target performance characteristics. Based on the evaluation results and/or an indication of convergence of the RL framework, the example reward determiner 108 determines whether to continue with an alternate (additional) mapping configuration (block 918). If not, such as when an indication of convergence suggests that further configuration attempts are unlikely to substantially improve performance characteristics, the example program of block 808 returns to block 810 of FIG. 8. However, in the event additional mapping configurations are to be attempted with the RL framework (block 918), then the example action determiner 110 updates the resource mapping to an alternate combination of hardware and/or memory (block 920). In some examples, the alternate combination of which hardware and which memory combination to attempt is guided by an example reward function, such as the example reward function of FIG. 5B. The example action determiner 110 applies such mapping configuration to the example resources 112 (or hardware 308, or hardware simulator 310) and executes the configuration in an effort to acquire additional performance datapoints (block 922). Control then returns to block 902.

Returning to the illustrated example of FIG. 8, in response to completion of analyzing one layer of the example network (block 808), the example layer map generator 508 stores the mapping configuration for the previously analyzed layer that has a relatively highest score. For example, in the event of a desire to improve (e.g., optimize) multiple performance metrics for the model, the respective mapping configuration that exhibits a relatively highest aggregate score is selected as the hardware configuration to be used for that layer. The example layer map generator 508 stores the improved (e.g., optimized) configuration in the example workload data store 306 (block 810).

The example layer selector 504 determines whether there are one or more additional layers of the model to analyze (block 812). If so, then control returns to block 804 to initiate another iteration. On the other hand, when the example layer selector 504 determines that all layers of the model have been analyzed (and a corresponding improved (e.g., optimized) mapping for each respective layer has been determined and stored in the example workload data store 306) (block 812), then the example layer map generator 508 generates a mapping file for the model (block 814). As described above, the mapping file may be generated in a manner consistent with the example mapping file 700 of FIG. 7. The example neural network mapper 302 uses the generated mapping file to override compiler directives of a compiler (block 816), such as the example compiler 312 of FIG. 3.

Figure 10:
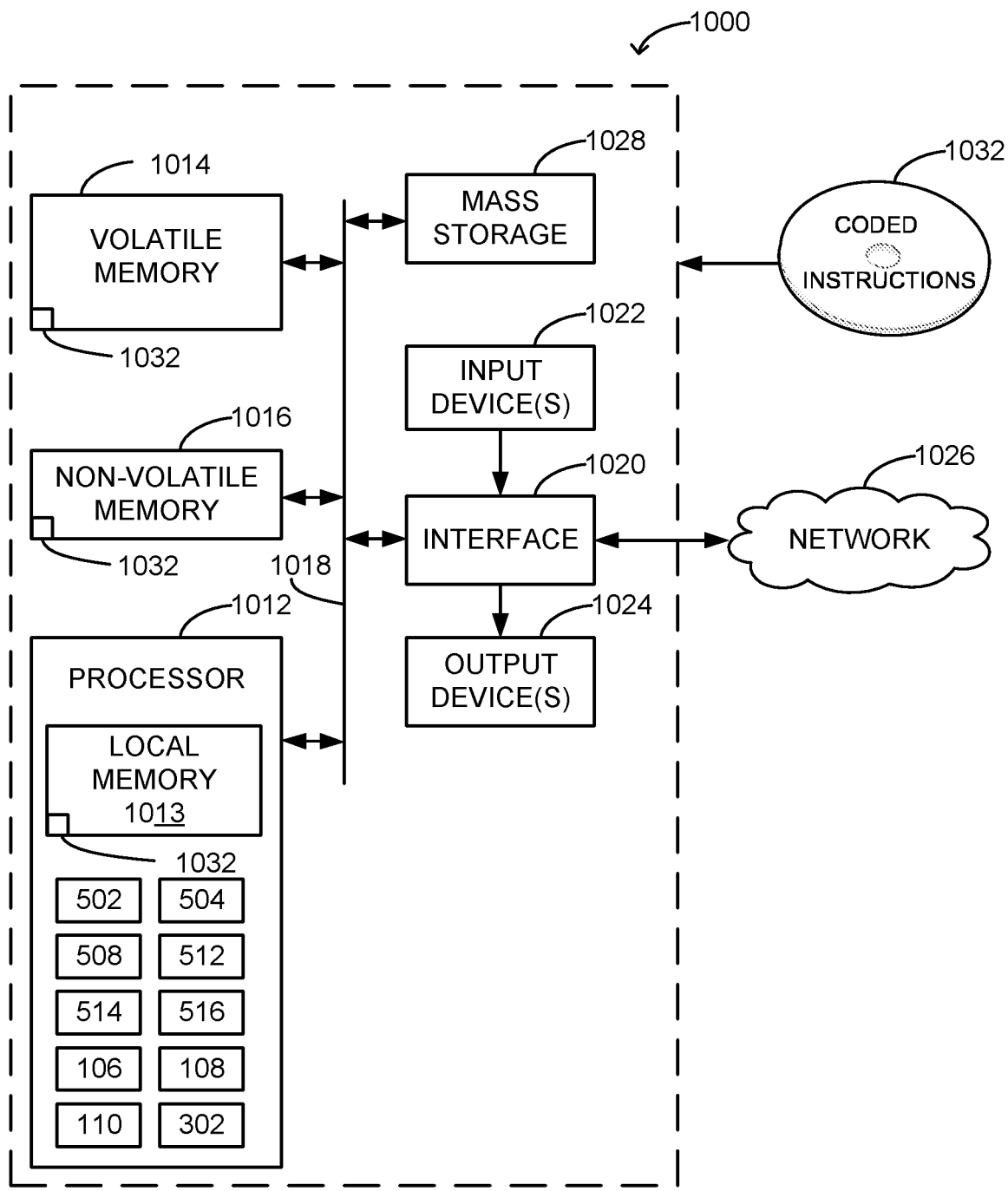
FIG. 10 is a block diagram of an example processing platform structured to execute the instructions of FIGS. 8 and/or 9 to implement the example mapping processes of FIGS. 1 and/or 2, to implement the example system of FIG. 3, and/or to implement the example neural network mapper of FIGS. 3 and 5A.

FIG. 10 is a block diagram of an example processor platform 1000 structured to execute the instructions of FIGS. 8 and 9 to implement the neural network mapper 302 of FIGS. 3 and/or 5A. The processor platform 1000 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a digital video recorder, a gaming console, a personal video recorder, a set top box, a headset or other wearable device, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example neural network input detector 502, the example layer selector 504, the example layer map generator 508, the example iteration tracker 512, the example constraint definer 514, the example agent generator 516, the example state definer 106, the example action determiner 110, the example reward determiner 108 and/or, more generally, the example neural network mapper 302.

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), a Bluetooth® interface, a near field communication (NFC) interface, and/or a PCI express interface.

In the illustrated example, one or more input devices 1022 are connected to the interface circuit 1020. The input device(s) 1022 permit(s) a user to enter data and/or commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1020 of the illustrated example, thus, typically includes a graphics driver card, a graphics driver chip and/or a graphics driver processor.

The interface circuit 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1026. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, redundant array of independent disks (RAID) systems, and digital versatile disk (DVD) drives.

The machine executable instructions 1032 of FIGS. 8 and 9 may be stored in the mass storage device 1028, in the volatile memory 1014, in the non-volatile memory 1016, and/or on a removable non-transitory computer readable storage medium such as a CD or DVD.

From the foregoing, it will be appreciated that example methods, apparatus and articles of manufacture have been disclosed that improve resource utilization of neural networks. In particular, examples disclosed herein overcome the inefficiency of standard compilers that attempt to assign resources to neural networks using heuristics or rule-based approaches. For instance, mere application of the greedy algorithm that is implemented by typical compilers causes substantial hardware utilization inefficiencies and poor network performance. Such poor performance is due to, in part, a lack of consideration of multiple performance characteristics of interest to be improved (e.g., optimized) when selecting particular hardware to be applied on a layer-by-layer basis of a neural network. Disclosed methods, apparatus and articles of manufacture improve the efficiency of executing an AI/DL/NN machine learning operation(s) on a computing device by facilitating resource selection in a manner that avoids operator discretion or inefficient and short-sighted application of the greedy algorithm. Improved resource mapping techniques disclosed herein facilitate resource selection with reinforcement learning in view of multiple performance characteristics measured by one or more cost/reward functions, such that subsequent resource combination permutations attempt to improve (e.g., maximize) the cost/reward function. Accordingly, disclosed methods, apparatus, systems and articles of manufacture are directed to one or more improvement(s) in the functioning of a computer.

Example methods, apparatus, systems, and articles of manufacture to map workloads are disclosed herein. Further examples and combinations thereof include the following:

Example 1 includes an apparatus to generate a resource map for a neural network, the apparatus comprising a constraint definer to define performance characteristic targets of the neural network, an action determiner to apply a first resource configuration to candidate resources corresponding to the neural network, a reward determiner to calculate a results metric based on (a) resource performance metrics and (b) the performance characteristic targets, and a layer map generator to generate a resource mapping file, the mapping file including respective resource assignments for corresponding layers of the neural network, the resource assignments selected based on the results metric.

Example 2 includes the apparatus as defined in example 1, further including a neural network mapper to scan a target platform to identify the candidate resources to execute the neural network.

Example 3 includes the apparatus as defined in example 1, wherein the reward determiner is to generate an iteration decision based on the results metric.

Example 4 includes the apparatus as defined in example 3, wherein the reward determiner is to cause the action determiner to apply a second resource configuration to the candidate resources.

Example 5 includes the apparatus as defined in example 4, wherein the reward determiner is to store one of the first resource configuration or the second resource configuration as a final resource directive based on a relative score of the first or second resource configuration.

Example 6 includes the apparatus as defined in example 3, wherein the iteration decision by the reward determiner is to cause the action determiner to stop evaluating a current layer of the neural network in response to a convergence indicator.

Example 7 includes the apparatus as defined in example 6, further including a layer selector to select a subsequent layer of the neural network to analyze in response to the convergence indicator.

Example 8 includes the apparatus as defined in example 1, further including a state definer to generate the resource performance metrics corresponding to execution of the candidate resources using the first resource configuration.

Example 9 includes the apparatus as defined in example 1, further including a neural network mapper to override compiler directives based on the resource mapping file.

Example 10 includes the apparatus as defined in example 1, further including a neural network input detector to retrieve a model corresponding to the neural network.

Example 11 includes a non-transitory computer readable storage medium comprising computer readable instructions that, when executed, cause one or more processors to, at least define performance characteristic targets of a neural network, apply a first resource configuration to candidate resources corresponding to the neural network, calculate a results metric based on (a) resource performance metrics and (b) the performance characteristic targets, and generate a resource mapping file, the mapping file including respective resource assignments for corresponding layers of the neural network, the resource assignments selected based on the results metric.

Example 12 includes the storage medium as defined in example 11, wherein the instructions, when executed, cause the one or more processors to scan a target platform to identify the candidate resources to execute the neural network. 13 the storage medium as defined in example 11, wherein the instructions, when executed, cause the one or more processors to generate an iteration decision based on the results metric.

Example 14 includes the storage medium as defined in example 13, wherein the instructions, when executed, cause the one or more processors to apply a second resource configuration to the candidate resources.

Example 15 includes the storage medium as defined in example 14, wherein the instructions, when executed, cause the one or more processors to store one of the first resource configuration or the second resource configuration as a final resource directive based on a relative score of the first or second resource configuration.

Example 16 includes the storage medium as defined in example 13, wherein the instructions, when executed, cause the one or more processors to stop evaluating a current layer of the neural network in response to a convergence indicator.

Example 17 includes the storage medium as defined in example 16, wherein the instructions, when executed, cause the one or more processors to select a subsequent layer of the neural network to analyze in response to the convergence indicator.

Example 18 includes the storage medium as defined in example 11, wherein the instructions, when executed, cause the one or more processors to generate the resource performance metrics corresponding to execution of the candidate resources using the first resource configuration.

Example 19 includes the storage medium as defined in example 11, wherein the instructions, when executed, cause the one or more processors to override compiler directives based on the resource mapping file.

Example 20 includes the storage medium as defined in example 11, wherein the instructions, when executed, cause the one or more processors to retrieve a model corresponding to the neural network.

Example 21 includes a method to generate a resource map for a neural network, the method comprising defining, by executing an instruction with at least one processor, performance characteristic targets of the neural network, applying, by executing an instruction with at least one processor, a first resource configuration to candidate resources corresponding to the neural network, calculating, by executing an instruction with at least one processor, a results metric based on (a) resource performance metrics and (b) the performance characteristic targets, and generating, by executing an instruction with at least one processor, a resource mapping file, the mapping file including respective resource assignments for corresponding layers of the neural network, the resource assignments selected based on the results metric.

Example 22 includes the method as defined in example 21, further including scanning a target platform to identify the candidate resources to execute the neural network.

Example 23 includes the method as defined in example 21, further including generating an iteration decision based on the results metric.

Example 24 includes the method as defined in example 23, further including applying a second resource configuration to the candidate resources.

Example 25 includes the method as defined in example 24, further including storing one of the first resource configuration or the second resource configuration as a final resource directive based on a relative score of the first or second resource configuration.

Example 26 includes the method as defined in example 23, further including stopping evaluation of a current layer of the neural network in response to a convergence indicator.

Example 27 includes the method as defined in example 26, further including selecting a subsequent layer of the neural network to analyze in response to the convergence indicator.

Example 28 includes the method as defined in example 21, further including generating the resource performance metrics corresponding to execution of the candidate resources using the first resource configuration.

Example 29 includes the method as defined in example 21, further including overriding compiler directives based on the resource mapping file.

Example 30 includes the method as defined in example 21, further including retrieving a model corresponding to the neural network.

Example 31 includes a system to generate a resource map for a neural network, the system comprising means for performance characteristic defining to define targets of the neural network, means for action applying to apply a first resource configuration to candidate resources corresponding to the neural network, means for results calculating to calculate a results metric based on (a) resource performance metrics and (b) the performance characteristic targets, and means for map generating to generate a resource mapping file, the mapping file including respective resource assignments for corresponding layers of the neural network, the resource assignments selected based on the results metric.

Example 32 includes the system as defined in example 31, further including means for neural network mapping to scan a target platform to identify the candidate resources to execute the neural network.

Example 33 includes the system as defined in example 31, wherein the results calculating means is to generate an iteration decision based on the results metric.

Example 34 includes the system as defined in example 33, wherein the results calculating means is to apply a second resource configuration to the candidate resources.

Example 35 includes the system as defined in example 34, wherein the results calculating means is to store one of the first resource configuration or the second resource configuration as a final resource directive based on a relative score of the first or second resource configuration.

Example 36 includes the system as defined in example 33, wherein the results calculating means is to cause the action determiner to stop evaluating a current layer of the neural network in response to a convergence indicator.

Example 37 includes the system as defined in example 36, further including means for layer selection to select a subsequent layer of the neural network to analyze in response to the convergence indicator.

Example 38 includes the system as defined in example 31, further including means for state defining to generate the resource performance metrics corresponding to execution of the candidate resources using the first resource configuration.

Example 39 includes the system as defined in example 31, further including means for neural network mapping to override compiler directives based on the resource mapping file.

Example 40 includes the system as defined in example 31, further including means for detecting neural network inputs to retrieve a model corresponding to the neural network.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. A non-transitory machine readable storage medium comprising instructions to cause first processor circuitry to at least:
  cause execution of a neural network (NN) model with a first configuration of hardware circuitry to determine first performance metrics;

cause execution of the NN model with a second configuration of the hardware circuitry to determine second performance metrics;
compare the first performance metrics and the second performance metrics; and
determine one of the first configuration of the hardware circuitry or the second configuration of the hardware circuitry for execution of the NN model based on the comparison of the first performance metrics and the second performance metrics.

2. The non-transitory machine readable storage medium as defined in claim 1, further including the instructions to cause the first processor circuitry to generate a report corresponding to the determined one of the first configuration of the hardware circuitry or the second configuration of the hardware circuitry.

3. The non-transitory machine readable storage medium as defined in claim 1, wherein the instructions cause the first processor circuitry to:
cause execution of the NN model during a first iteration to determine first latency metrics; and
cause execution of the NN model during a second iteration to determine second latency metrics, the first and second latency metrics corresponding to the first and second performance metrics, respectively.

4. The non-transitory machine readable storage medium as defined in claim 1, wherein the instructions cause the processor circuitry to generate configuration instructions corresponding to the first configuration of the hardware circuitry or the second configuration of the hardware circuitry.

5. The non-transitory machine readable storage medium as defined in claim 1, wherein the NN model includes a first layer and a second layer, the instructions to cause the processor circuitry to:
determine first layer performance metrics corresponding to execution of the first configuration of the hardware circuitry with the first layer; and
determine second layer performance metrics corresponding to execution of the first configuration of the hardware circuitry with the second layer.

6. The non-transitory machine readable storage medium as defined in claim 5, wherein the instructions cause the processor circuitry to compare the first layer performance metrics with the second layer performance metrics.

7. The non-transitory machine readable storage medium as defined in claim 6, wherein the instructions cause the processor circuitry to assign one of the first layer or the second layer of the NN model to execute on the first configuration of the hardware circuitry based on the comparison.

8. The non-transitory machine readable storage medium as defined in claim 6, wherein the instructions cause the processor circuitry to instantiate a simulator to determine the first layer performance metrics and the second layer performance metrics.

9. The non-transitory machine readable storage medium as defined in claim 6, wherein the instructions cause the processor circuitry to generate a relative score between the first layer performance metrics and the second layer performance metrics.

10. An apparatus comprising:
action determiner circuitry to:
cause execution of a neural network (NN) model with a first configuration of hardware circuitry to determine first performance metrics; and
cause execution of the NN model with a second configuration of the hardware circuitry to determine second performance metrics;
reward determiner circuitry to compare the first performance metrics and the second performance metrics; and
map generator circuitry to determine one of the first configuration of the hardware circuitry or the second configuration of the hardware circuitry to execute the NN model based on the comparison of the first performance metrics and the second performance metrics.

11. The apparatus as defined in claim 10, further including state definer circuitry to generate a report corresponding to the determined one of the first configuration of the hardware circuitry or the second configuration of the hardware circuitry.

12. The apparatus as defined in claim 10, wherein the action determiner circuitry is to:
cause execution of the NN model during a first iteration to determine first latency metrics; and
cause execution of the NN model during a second iteration to determine second latency metrics, the first and second latency metrics corresponding to the first and second performance metrics, respectively.

13. The apparatus as defined in claim 10, wherein the reward determiner circuitry is to generate configuration instructions corresponding to the first configuration of the hardware circuitry or the second configuration of the hardware circuitry.

14. The apparatus as defined in claim 10, wherein the action determination circuitry is to:
determine first layer performance metrics corresponding to a first layer of the NN model, the first layer performance metrics corresponding to execution of the first configuration of the hardware circuitry with the first layer of the NN model; and
determine second layer performance metrics corresponding to a second layer of the NN model, the second layer performance metrics corresponding to execution of the first configuration of the hardware circuitry with the second layer of the NN model.

15. The apparatus as defined in claim 14, wherein the reward determiner circuitry is to compare the first layer performance metrics with the second layer performance metrics.

16. The apparatus as defined in claim 15, wherein the map generator circuitry is to assign one of the first layer or the second layer of the NN model to execute on the first configuration of the hardware circuitry based on the comparison.

17. A method comprising:
determining, by executing an instruction with programmable circuitry, first performance metrics corresponding to execution of a neural network (NN) model with a first configuration of hardware circuitry;
determining, by executing an instruction with the programmable circuitry, second performance metrics corresponding to execution of the NN model with a second configuration of the hardware circuitry;
comparing, by executing an instruction with the programmable circuitry, the first performance metrics and the second performance metrics; and
determining, by executing an instruction with the programmable circuitry, one of the first configuration of the hardware circuitry or the second configuration of the hardware circuitry for execution of the NN model based on the comparison of the first performance metrics and the second performance metrics.

18. The method as defined in claim 17, further including generating a report corresponding to the determined one of the first configuration of the hardware circuitry or the second configuration of the hardware circuitry.

19. The method as defined in claim 17, further including:
determining first layer performance metrics corresponding to execution of a first layer of the NN model with the first configuration of the hardware circuitry; and
determining second layer performance metrics corresponding to execution of a second layer of the NN model with the first configuration of the hardware circuitry.

20. The method as defined in claim 19, further including assigning one of the first layer or the second layer of the NN model to execute on the first configuration of the hardware circuitry based on a comparison of the first layer performance metrics and the second layer performance metrics.

\* \* \* \* \*

UNITED STATES PATENT AND TRADEMARK OFFICE
CERTIFICATE OF CORRECTION

| | | |
|---|---|---|
| PATENT NO. | : 12,260,323 B2 | Page 1 of 1 |
| APPLICATION NO. | : 18/491246 | |
| DATED | : March 25, 2025 | |
| INVENTOR(S) | : Estelle Aflalo et al. | |

It is certified that error appears in the above-identified patent and that said Letters Patent is hereby corrected as shown below:

In the Drawings

In FIG. 9, Field 922, delete "RSOURCES" and insert --RESOURCES--.

Signed and Sealed this
Twentieth Day of May, 2025

Coke Morgan Stewart
*Acting Director of the United States Patent and Trademark Office*